(12) United States Patent
Kannengiesser (10) Patent No.: US 9,718,232 B2
(45) Date of Patent: Aug. 1, 2017

(54) CONTAINERS AND APPARATUS AND METHOD FOR FABRICATING AND FILLING CONTAINERS

(71) Applicant: DISCMA AG, Hunenberg (CH)

(72) Inventor: Damien Kannengiesser, Golbey (FR)

(73) Assignee: DISCMA AG, Hunenberg (CH)

( * ) Notice: Subject to any disclaimer, the term of this patent is extended or adjusted under 35 U.S.C. 154(b) by 101 days.

(21) Appl. No.: 14/652,631

(22) PCT Filed: Dec. 5, 2013

(86) PCT No.: PCT/EP2013/075629
§ 371 (c)(1),
(2) Date: Jun. 16, 2015

(87) PCT Pub. No.: WO2014/095384
PCT Pub. Date: Jun. 26, 2014

(65) Prior Publication Data
US 2015/0328823 A1  Nov. 19, 2015

(30) Foreign Application Priority Data
Dec. 19, 2012 (EP) .................................... 12198193

(51) Int. Cl.
*B29C 49/46* (2006.01)
*B29C 49/48* (2006.01)
(Continued)

(52) U.S. Cl.
CPC .............. *B29C 49/12* (2013.01); *B29C 49/46* (2013.01); *B29C 49/4815* (2013.01);
(Continued)

(58) Field of Classification Search
CPC .................. B65B 3/26; B29C 49/4815; B29C 2049/4807; B29C 2049/4664; B29C 49/46
See application file for complete search history.

(56) References Cited

U.S. PATENT DOCUMENTS 3,911,071 A * 10/1975 Naumann ........... B29C 49/4247
264/296
4,054,017 A    10/1977 Naumann
(Continued)

FOREIGN PATENT DOCUMENTS

DE      3834184 C1   12/1989
EP       298227 A1    1/1989
WO    2012010460 A1   1/2012

*Primary Examiner* — Robert B Davis
(74) *Attorney, Agent, or Firm* — Eric J. Sosenko; Jonathan P. O'Brien; Honigman Miller Schwartz and Cohn LLP (57) ABSTRACT

An apparatus (100) for the fabrication of a container (300) comprising a mold (121) defining the form of said container (300) and configured to accommodate a substantially tubular preform, an injection head (115) configured to interface with the preform (108) and establish fluid communication with a cavity thereof; and an injection valve (202), said injection valve (202) configured to selectively permit fluid communication through said injection head (115); said apparatus (100) further comprising at least one compression means (303A, 303B) mobile relative to said mold (121) such that said at least one compression means (303A, 303B) is disposed outside said mold cavity (105) in a retracted position and projects into said mold cavity (105) in an extended position.

11 Claims, 4 Drawing Sheets

(51) Int. Cl.
*B65B 3/26* (2006.01)
*B29C 49/12* (2006.01)
*B65B 3/02* (2006.01)
B29L 31/00 (2006.01)
B29C 49/06 (2006.01)
B29C 49/42 (2006.01)

(52) U.S. Cl.
CPC ............... *B65B 3/022* (2013.01); *B65B 3/26* (2013.01); *B29C 49/06* (2013.01); *B29C 49/4289* (2013.01); *B29C 2049/4294* (2013.01); *B29C 2049/4664* (2013.01); *B29C 2049/4807* (2013.01); *B29C 2049/4892* (2013.01); *B29L 2031/7158* (2013.01)

(56) References Cited

U.S. PATENT DOCUMENTS

| | | | | |
|---|---|---|---|---|
| 4,926,613 | A * | 5/1990 | Hansen | .................... B65B 3/022 53/433 |
| 7,744,365 | B2 * | 6/2010 | Maddox | .................. B29C 49/42 425/522 |
| 8,431,068 | B2 * | 4/2013 | Hansen | ............... B29C 49/4817 264/500 |
| 2012/0207872 | A1 | 8/2012 | Lisch et al. | |
| 2013/0113143 | A1 * | 5/2013 | Fevre | ...................... B29C 49/46 264/524 |
| 2015/0246475 | A1 * | 9/2015 | Suyama | .................. B29C 49/58 264/526 |
| 2016/0023785 | A1 * | 1/2016 | Clusserath | .............. B29C 49/78 264/40.1 |

\* cited by examiner

CONTAINERS AND APPARATUS AND METHOD FOR FABRICATING AND FILLING CONTAINERS

CROSS-REFERENCE TO RELATED APPLICATION

This application is the U.S. national phase of PCT Application No. PCT/EP2013/075629 filed on Dec. 5, 2013, which claims priority to EP Patent Application No. 12198193.0 filed on Dec. 19, 2012, the disclosures of which are incorporated in their entirety by reference herein.

FIELD OF THE INVENTION

This invention relates generally to an apparatus for the fabricating and filling of containers. The invention also relates to a method of employing said apparatus to fabricate and fill containers, as well as the container so produced.

BACKGROUND OF THE INVENTION

It is commonly known in the art of container fabrication to fabricate containers by the stretch blow molding process. In the stretch blow molding process, a substantially tubular parison or "preform" is provided, being fabricated from a thermoplastic and having an open end near a mouth and a closed end opposite the open end. The preform is disposed within a mold having a cavity substantially defining the form and contours of a container.

The preform is expanded into the cavity of the mold by the action of a working fluid injected into the preform under pressure, and by the action of a stretching rod inserted into a mouth of the preform. The pressurized fluid causes the preform to inflate, expanding primarily radially. The stretching rod is advanced into the preform and presses against an opposite interior surface, stretching it longitudinally into the mold.

Conventionally, the pressurized fluid injected during the molding of the container is air, usually heated to facilitate the deformation of the preform. However, it is known to use a liquid as the working fluid, preferably the liquid which is ultimately to be packaged within the container. In this way, the process of forming a container and filling it with a product are effectively combined, realizing great advantages in equipment cost and production efficiency compared to an air-injection stretch blow molding system.

When filling a container with a liquid, it is necessary to leave a small void space at the top of the container. This void space enables the consumer to open the container without spilling any of the liquid contained therein, as well as provides compensation for any thermal expansion of the liquid during storage.

In processes where the fabrication and filling of the container are carried out in separate steps, providing this void space is a relatively trivial matter. In a process so configured, one need only dispense a volume of liquid product into the container during the filling step that is less than the total volume of the container by the desired amount, leaving the necessary void space in the container.

In a combined forming-filling container fabrication process, however, this is not a feasible option. Specifically, in order to ensure that the preform is fully expanded into the cavity of the mold and that all of the contours of the resulting container are fully formed, one must inject a volume of liquid equal to the full, final volume of the container. The resulting container is thus filled to the brim with the liquid product.

The stretching rod does occupy some volume within the container, and retracting it at the completion of the forming-filling process will create a small amount of void space in the container. The void space created by the displacement of the stretching rod, however, is not always sufficient for the prevention of spilling when the container is opened, especially where a particularly thin stretching rod is employed.

Increasing the diameter of the stretching rod will increase the volume of the void space ultimately created in the container; however, the space between the stretching rod and the interior surface of the mouth of the container are coordinately reduced, impeding the injection of the liquid during the forming of the container. It is therefore necessary to remove a portion of the liquid from the container after the injection process is completed.

One method of achieving this is to remove a small amount of the liquid by suction, in particular by sucking some of the liquid back through the means for injecting it into the preform during the fabrication of the container.

In particular, the document WO 2010/003853 A1 describes a stretch blow molding system in which the stretch rod is hollow, and contains at least one port at a distal end through which this extra liquid may be aspirated from the beverage container.

While this system produces acceptable filled containers, it is disadvantageous in several aspects. First, the at least one port in the stretch rod must remain sealed during the injection of the liquid, which increases the complexity of the apparatus and the expense of its manufacture and operation.

Furthermore, the channel within the stretch rod is difficult and time-consuming to clean as the apparatus must be at least partially disassembled to give access to the entire channel. In addition, dissolved material in the liquid will tend to form accretions in the narrow channel and ports, a particularly acute problem when the liquid is mineral water. These accretions reduce the flow through the hollow stretch rod, requiring time-consuming cleaning and maintenance to maintain efficient functioning of the apparatus.

It is therefore an object of this invention to provide a method for fabricating and filling a beverage container which provides a void space in a formed and filled container without the disadvantageous aspects of the apparatuses known in the art.

SUMMARY OF THE INVENTION

According, therefore, to a first aspect, the invention is drawn to an apparatus for the fabrication of a container comprising a mold comprising a plurality of mold segments substantially defining a mold cavity in the form of a container and being further configured to accommodate a substantially tubular preform having a closed first end and defining a preform cavity communicating with a mouth at an open second end; an injection head, said injection head configured to interface with the mouth of the preform and establish fluid communication between a liquid supply and said mouth; and an injection valve, said injection valve configured to selectively permit fluid communication through said injection head.

According to the invention, said apparatus is characterized in that it further comprises at least one compression means mobile relative to said mold such that said at least one compression means is disposed outside said mold cavity in a retracted position and projects into said mold cavity in an extended position.

This is advantageous in that the compression means will compress the container when advanced into the extended position, expelling a portion of the liquid within from the container, providing a void space in the container more simply, accurately, and economically than the methods known in the prior art.

Specifically, the relationship between the actuation of the compression means and the volume of the liquid expelled from the container is more direct and more accurate than that of the apparatuses known in the art, which require such fixtures as pumps, flowmeters, etc. which each introduce a degree of inaccuracy in the extraction of liquid from the container. The volume of liquid expelled from the container is directly proportional to the degree to which the container is compressed, itself a function of the extension of the compression means into the mold cavity. The accuracy with which the containers are filled is thereby improved. The apparatus is also advantageous in that the cleanliness of its operation is maximized. Since the apparatus acts only on the exterior of the container to expel water from it, the proportion of the surface of the apparatus which may be in contact with the liquid is minimized, thereby minimizing the effort required to keep clean these sensitive surfaces. The apparatus may thus be operated more economically than those known in the art while maintaining the proper standards of cleanliness.

Preferably, the said at least one compression means comprises at least one compression tab, said at least one compression tab comprising a portion of and being mobile relative to at least one of said mold segments and forming a portion of the surface of said mold cavity when in the retracted position.

This is advantageous in that the portion of the surface of the compression tab which forms a portion of the surface of the mold cavity will by its nature substantially conform to the contours of the container it contacts when it is in the extended position. The compression exerted upon the container by each compression tab will thus be applied in a manner which minimizes localized stresses in the wall of the container, reducing the likelihood of damage to the container and optimizing the controllability of the apparatus. The expulsion of liquid from the container is thereby rendered more accurate, producing more accurately-filled containers.

Furthermore, the disposition of at least one compression tab within at least one of the mold segments is advantageous in that, by incorporating the compression means within the mold, the apparatus is made more compact and space-efficient.

According to a feature, the at least one compression means is mobile in a direction perpendicular to a longitudinal axis of the mold cavity.

This is advantageous in that the volume of liquid expelled from the container is maximized for a given distance the compression means extends into the mold cavity. Thus, for a given maximum extension of the compression means in to the mold cavity, the maximum volume of liquid that may be expelled by an apparatus is increased. Configuring the compression means to be mobile in a direction perpendicular to a longitudinal axis of the mold cavity thus improves the efficiency of the apparatus and increases the range of configurations of the container which is can produce.

According to another feature, the at least one compression means extends into the mold cavity at an area of locally reduced diameter of said mold cavity.

This is advantageous in that the compression means will be disposed so as to act upon the container at a region where, as a result of its locally reduced diameter, it will be more predisposed to deform than elsewhere on its surface. Thus, a greater volume of liquid will be expelled from the container for a given extension of the compression means into the mold cavity, improving the versatility and efficiency of the apparatus in producing properly filled containers.

According to another feature, there is provided a plurality of compression means being disposed so as to extend into the mold cavity at substantially uniform angular intervals about a longitudinal axis of said mold cavity when in the extended position.

This is advantageous in that the compression of the container resulting from the advancement of the compression means into the mold cavity will be symmetric, resulting in a uniform compression of the container and a maximized expulsion of liquid from said container for a given advancement of the compression means into the mold cavity. Furthermore, the disposition of the compression means at substantially uniform angular intervals will avoid damage to the container by the compressive force exerted upon it by the compression means, in that the substantially uniform disposition of the compression means will minimize the concentration of stresses in the wall of the container and thereby avoid damaging the container when expelling the liquid from it. The apparatus is thus rendered more effective and versatile.

According to still another feature, at least two compression tabs are disposed within one of the mold segments.

This is advantageous in that by providing a plurality of compression tabs within one of the mold segments, one will realize a greater degree of control over the expulsion of liquid from the container. The compression tabs will each affect the compression of the container effectuated by each of the others, augmenting or mitigating the overall compression of the container depending on the degree to which each compression tab is extended into the mold cavity. By manipulating the extension of each of the compression tabs, one will realize a greater degree of control over the expression of liquid from the container.

This is particularly true when the compression tabs are disposed along the length of the container. Specifically, a plurality of compression tabs so disposed will act upon the container at regions thereof according to their predisposition to deformation; the tab disposed in the region of a greater predisposition to deformation will express a greater volume of liquid at a given degree of extension, and vice versa. By controlling the extension of each of the at least two compression tabs, one realizes both a coarse and a fine control over the expulsion of the liquid, thereby maximizing the precision with which the apparatus is operated.

According to still another feature, the injection valve is disposed within the injection head coaxially with a nozzle of said injection head, said injection valve seating in said nozzle when in a closed position.

This is advantageous in that the injection valve is integrated into the injection head. The entirety of the apparatus is thereby rendered more compact while also reducing the volume of the liquid channels of the apparatus between the nozzle of the injection head and the injection valve. The accuracy and responsiveness of the injection head and the flexibility of its disposition within the apparatus are both thereby improved.

According to still another feature, the apparatus further comprises a stretching rod mobile relative to the preform along a longitudinal axis of said preform and configured to press against an interior surface of said preform at the closed first end thereof.

This is advantageous in that the action of the stretching rod will facilitate the deformation of the preform along its longitudinal axis, making the apparatus capable of producing containers with a more elongated aspect than without such a stretching rod. The versatility of the apparatus, and by extension the range of containers in which its other advantages may be realized, is thereby improved.

According to a second aspect, the invention is drawn to a method for the fabrication of a container, comprising the steps of providing a substantially tubular preform, said preform having a closed first end and defining a preform cavity communicating with a mouth at an open second end; disposing the preform at least partially within a mold comprised of a plurality of mold segments and being provided with a mold cavity substantially defining the form of a container; positioning an injection head upon the mouth of the preform, said injection head establishing fluid communication between said mouth and a liquid source, an injection valve selectively permitting fluid communication through said injection head; injecting a volume of liquid into the preform cavity, said liquid flowing from the fluid source to said preform cavity through the injection head and the open injection valve, the preform being thereby induced to expand into the contours of the mold cavity and form a container; extending the at least one compression means from a retracted position outside said mold cavity into an extended position projecting into said mold cavity, said container being thereby compressed and a portion of the liquid within said container being thereby expelled through the injection head; closing the injection valve, thereby blocking fluid communication between the container and the liquid source; and withdrawing the injection head and the at least one compression means from the container.

This is advantageous in that such a method will realize the advantages of the apparatus described above in fabricating and filling containers. This method will thus fabricate and fill containers more accurately and economically, and with greater cleanliness and reliability, than the methods known in the art.

According to a feature, said at least one compression means is a compression tab comprising a portion of and being mobile relative to at least one of said mold segments and forming a portion of the surface of said mold cavity when in the retracted position.

This is advantageous in that providing said at least one compression means as a compression tab according to the above description will result in a compressive force being applied to the container in a manner which minimizes local stresses in the wall of the container and maximizes the controllability of the expulsion of liquid, as discussed above.

According to another feature, between the injecting and extending steps there is a step for separating the mold segments.

This is advantageous in that the separation of the mold segments enables the container to be deformed under by the at least one compression means into forms which would be otherwise restricted by the presence of a mold segment. The method is thus rendered more versatile and the scope of its possible applications enlarged.

Furthermore, the separation of the mold segments enables the use of compression means which are disposed entirely outside the mold, being extended into the mold cavity through a gap created during the step for separating the mold segments. In a method so executed, the surface of the mold cavity is not interrupted or otherwise distinguished by the at least one compression means, producing a container which lacks witness marks from such interruptions. The quality of the containers produced by the method is thereby improved.

According to still another feature, during the injecting step a stretching rod is inserted into the preform cavity through the mouth of the preform, said stretching rod being pressed into an interior surface of the closed first end of said preform and inducing said preform to deform along its longitudinal axis.

This is advantageous in that it enables the fabrication and filling of containers in more and different forms, as discussed above.

According to a third aspect, the invention is drawn to a container produced by the method as previously discussed.

This is advantageous in that such a container will embody the advantages discussed above.

Other particularities and advantages of the invention will also emerge from the following description.

BRIEF DESCRIPTION OF THE DRAWINGS

In the accompanying drawings, given by way of non-limiting examples.

DETAILED DESCRIPTION

Figure 1A:
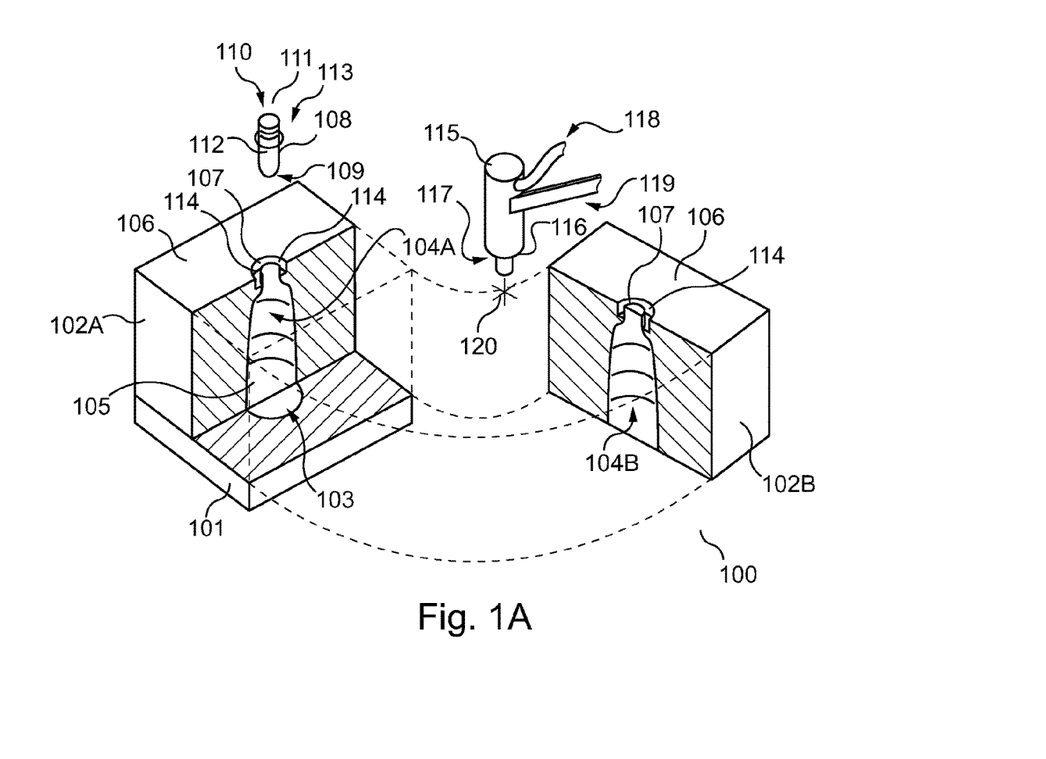
FIGS. 1A and 1B are perspective depictions of an exemplary stretch blow molding apparatus according to a first embodiment, in a partially-exploded and assembled disposition, respectively.
Figure 1B:
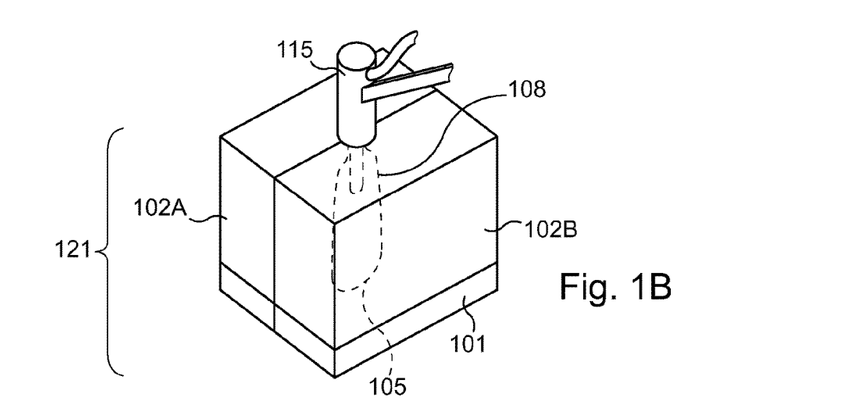

FIGS. 1A and 1B are perspective views of an exemplary stretch blow molding apparatus 100 according to an embodiment of the invention. FIG. 1A depicts the apparatus in a partially-exploded disposition. The apparatus 100 comprises a base mold segment 101 and the two lateral mold segments 102A and 102B. The base mold segment 101 is provided with a base depression 103 substantially defining the base of a container, while the lateral mold segments 102A and 102B are respectively provided with the lateral depressions 104A and 104B, each substantially defining half of the body of a container. The base depression 103 and lateral depressions 104 together form the mold cavity 105, which substantially defines the form of a container.

The lateral depressions 104A and 104B each communicate with a top face 106 of their respective lateral mold segments 102A and 102B, cooperating to form a mold hole 107 communicating with the mold cavity 105. Into the mold hole 107 is disposed a preform 108, which is substantially tube-shaped and comprises a closed end 109 and a mouth 110 at an open end 111 communicating with a preform cavity 112 within said preform 108.

In this embodiment of the invention, the mold segments 101, 102A, and 102B are depicted as substantially independent components, each being capable of a full range of motion independent from the other two. It may be preferable, however, to provide linkages or other such connections between the mold segments so as to restrict their range of motion relative to each other, or to provide that the mold segments are linked together by means such as rails or sliders.

In FIG. 1A the preform 108 is shown removed from the mold cavity 105 for clarity; however, it should be understood that the preform 108 is disposed so that it is substantially within the mold cavity 105. Preferably, the preform 108 is provided with a flange 113, which will rest on the top faces 106 of the lateral mold segments 102. The top faces 106 may be further provided with a preform seat 114 disposed about the mold hole 107, which locates the flange 113 of the preform 108, positioning and centering the preform 108 within the mold cavity 105.

Preferably, the open end 111 of the preform 108 protrudes from the top faces 106 of the lateral mold segments 102A and 102B, while the rest of the preform 108 is thus disposed within the mold cavity 105 defined by the base depression 103 and lateral depressions 104.

The apparatus 100 further comprises an injection head 115. The injection head 115 is provided with a nozzle 116 which is configured to mate with the mouth 110 of the preform 108 and create a fluid-tight seal therewith. The injection head 115 is further provided with a stretching rod 117 which is here depicted slightly extended from the nozzle 116. The injection head 115 is connected to a fluid supply 118, such that a volume of fluid may be conducted from said fluid supply 118 through the injection head 115 and out the nozzle 116. The fluid supply 118 is controlled by an injection valve, which may be disposed within the injection head 115 as here, or optionally outboard of the injection head, for example in a pumping unit or other such fluid handling system.

Furthermore, In FIG. 1A, the injection head 115 is affixed by the arm 119 to a positioning mechanism, such that it may translate in each of the six principal axes 120 and position itself upon the mouth 110 of the preform 108. However, it should be understood that the injection head 115 need not necessarily be so configured: depending on the integration of the molding apparatus 100 into the production line as a whole and the configuration of the molding apparatus in particular, it may only be necessary to provide, for example, a means for the injection head 115 to translate along a vertical axis relative to the mold segments 101 and 102. The exact configuration of the apparatus may be determined by one skilled in the art, according to the particular demands of the implementation.

FIG. 1B depicts the mold apparatus in an assembled disposition, with the mold segments 101, 102A, and 102B brought together in abutment to form the mold 121 which defines the mold cavity 105. The preform 108 is disposed substantially within the mold cavity 105, and the injection head 115 is positioned over the mouth (not shown) of the preform 108 which protrudes from the mold cavity 105. At this point, the injection head 115 is ready to inject a quantity of liquid into the preform 108 and expand it into the contours of the mold cavity 105, forming a container.

Figure 2A:
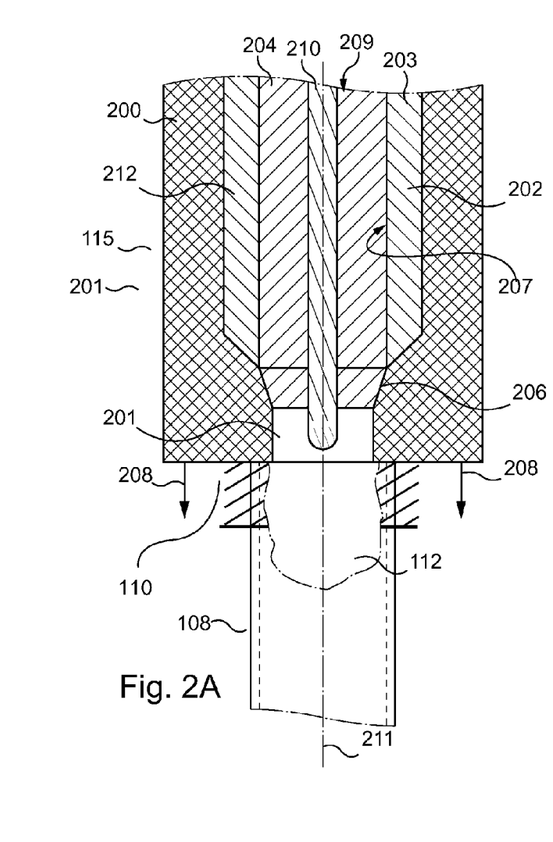
FIGS. 2A and 2B are orthogonal section views of the injection head of FIGS. 1A and 1B, the injection valve being closed in FIG. 2A and open in FIG. 2B.
Figure 2B:
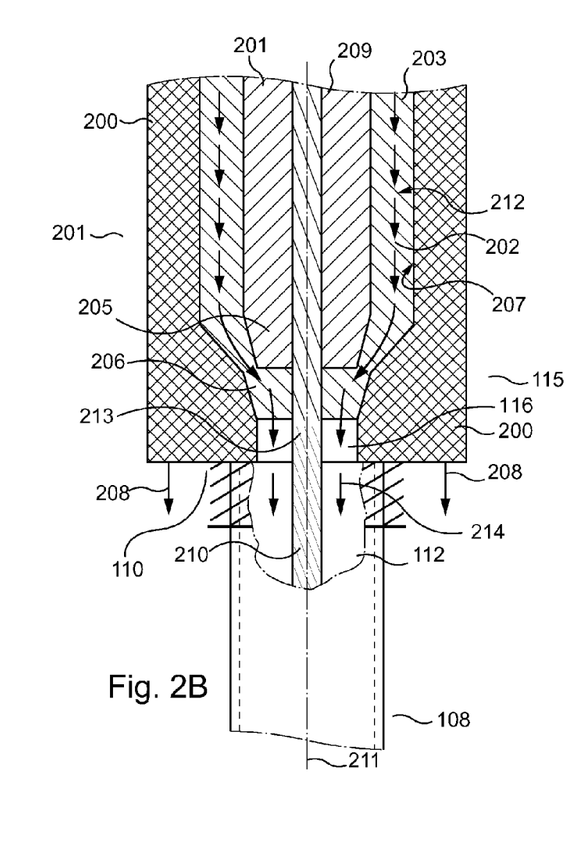

FIGS. 2A and 2B depicts a section view of the injection head 115 according to the embodiment of the invention of FIGS. 1A and 1B. FIG. 2A depicts the injection head 115 in a closed state as prior to an injecting step, and FIG. 2B depicts the injection head 115 in an open state as during an injection step.

As shown in FIGS. 2A and 2B, the injection head 115 comprises an outer shell 200, comprising generally a body section 201 and the nozzle 116, the latter being configured to mate with the mouth 110 of the preform 108 and communicate with a preform cavity 112 within said preform 108 as described above.

The injection head further comprises the injection valve 202, disposed within the outer shell 200 and defining the injection head cavity 203 between the two.

The injection head cavity 203 is thus provided in fluid communication with the nozzle 201.

The injection valve 202 is comprised of the valve body 204 which is provided with a taper 205 at said nozzle 201, and a valve seat 206 formed from a portion of an inner wall 207 of the outer shell 200 configured to mate with the taper 205. When in the closed position as shown in FIG. 2A, the valve body 204 will thus block fluid communication between the injection head cavity 203 and the preform cavity 112.

In some embodiments, it may also be advantageous to provide the injection head 115 with a means for sealing the joint between it and the preform 108, ensuring a fluid tightness between the two. In other embodiments, as here, the fluid-tightness between the injection head 115 and the preform 108 is furnished by the force 208 with which the injection head 115 is pressed into the preform 108. The stretching rod 117 is disposed coaxially within the valve body 204, the two independently mobile relative to each other. The valve body 204 is itself disposed coaxially with the valve seat 205 and the nozzle 201, such that the entire group of nozzle 201, valve body 204, valve seat 205, and stretching rod 117 are disposed in alignment along the longitudinal axis 211. The stretching rod 117 is preferably displaced by an electric actuator, though other means such as hydraulic cylinders, pneumatic actuators, and the like may alternately be employed.

FIG. 2A shows the injection head 115 prior to an injecting step. The valve body 204 is seated in the valve seat 206, blocking fluid communication through the injection head 115 and preventing flow of the liquid 212 through the nozzle 201. The stretching rod 117 is fully retracted within the injection head 115.

FIG. 2B shows the injection head 115 during an injecting step. The stretching rod 117 is advanced into the cavity 112. The stretching rod 117 is advanced into the closed end (not shown) of the preform 108 and causes the preform to stretch along the longitudinal axis 211.

Shortly thereafter, the valve body 204 is retracted from the valve seat 206, permitting the liquid 212 to flow through the nozzle 201 of the injection head.

The liquid 212 is injected with a flow 214 into the cavity 112 of the preform 108, further expanding the preform 108 and causing it to assume the form of the mold cavity (not shown) in which it is disposed.

FIGS. 3A through 3E respectively depict the injection head 115 of FIGS. 1A and 1B and a container 300 at the conclusion of an injecting step, during the extending and closing steps, and during and after a withdrawing step, and will be discussed in turn. FIGS. 3A through 3E broadly depict a container 300 which is disposed within a mold cavity (omitted for clarity) which is configured to substantially define the form of the container, as depicted in FIGS. 1A and 1B.

Figures 3A, 3B, 3C:
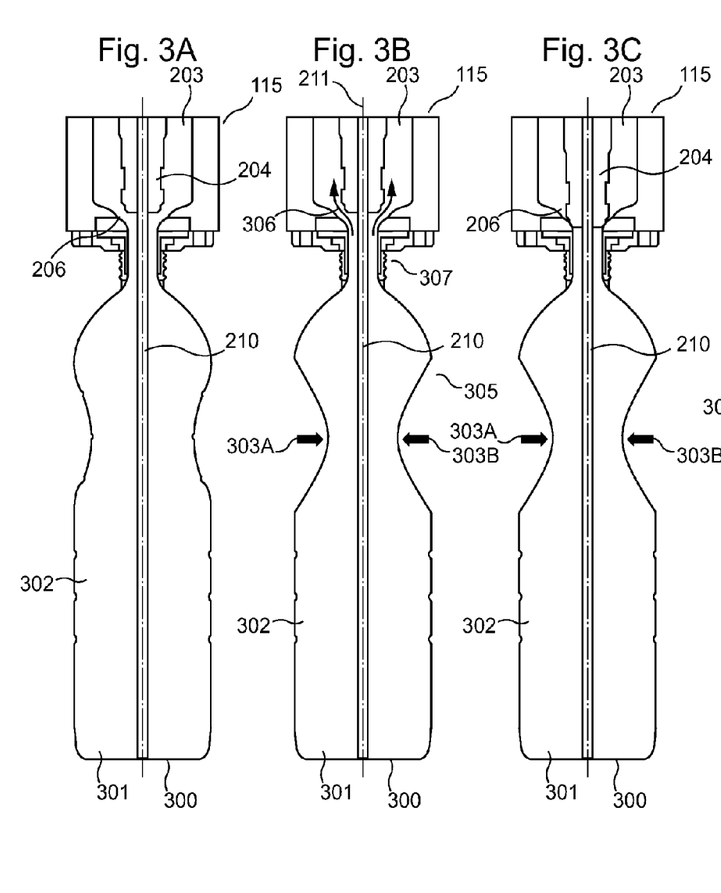
FIGS. 3A through 3E are a sequence of orthogonal section views of the injection head of FIGS. 1A and 1B and a container at the conclusion of an injecting step, during the extending, closing, and during and after a withdrawing step, respectively.

FIG. 3A depicts an injection head 115 and container 300 according to a second embodiment of the invention at the completion of an injection step. As depicted in FIG. 2B, the valve body 204 is retracted from the valve seat 206, enabling fluid communication between the injection head cavity 203 and the container cavity 301 of the container 300. The stretching rod 117 has been advanced to its full extent into the container 300, which has assumed its full and final shape and whose entire container cavity 301 is filled with the liquid 302.

FIG. 3B depicts the injection head 115 and container 300 during the extension step. The compression means 303A and 303B are here represented schematically, being advanced perpendicularly to the longitudinal axis 211 of the container 300 and compressing it at its waist 305.

It should be understood that the exact form of the compression means 303A and 303B may be chosen by one skilled in the art to best cooperate with the mold and the container being fabricated therein. The compression means may thus take the form of tongs or pincers, bars, levers, pneumatic or hydraulic bladders, or any other such form as may be appropriate to the particular application.

As the compression means 303A and 303B are extended into the mold cavity occupied by the container 300, the container 300 is deformed, causing an expelled portion 306 of the liquid 302 to be expelled from the container 300, through its mouth 307 and into the injection head cavity 203 of the injection head 115.

In the present embodiment, the compression means 303A and 303B are advanced into the mold cavity such that the volume of the expelled portion 306, and by extension the volume of void space remaining in the container 300, is approximately ¹⁄₁₁th of the volume of the container 300 prior to the extension step. The container 300 is thereby provided with a predetermined volume of the liquid 302 and a void space having a volume substantially equal to 10% of said volume of liquid 302.

Of course, it should be understood the present embodiment is an exemplary one. The exact volume of the expelled portion 306, and by extension the exact volume of liquid remaining in the container, may be directly controlled by regulating the extension of the compression means 303A and 303B into the mold cavity, and may vary from the 10% volume ratio as is necessary for the particular application in question.

FIG. 3C depicts the injection head 115 and container 300 during a closing step. The valve body 204 is re-seated upon the valve seat 206, closing off fluid communication between the injection head cavity 203 and the container cavity 301, while the compression means 303A and 303B remain in the extended position. The seating of the valve body 204 upon the valve seat 206 serves to prevent any further liquid 302 from entering the container 300.

Figure 3D:
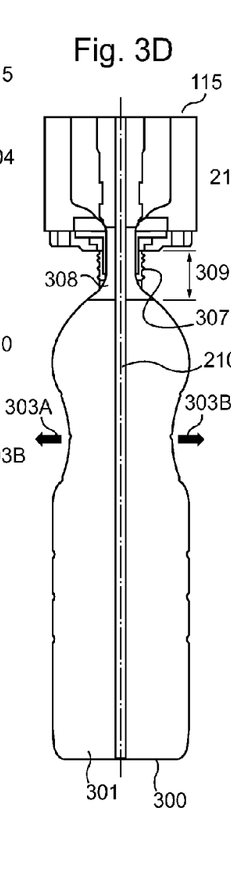

FIG. 3D depicts the injection head 115 and container 300 during a withdrawing step. The injection head 115 is withdrawn from the mouth 307 of the container 300, permitting communication between the container cavity 301 and the surrounding atmosphere. The compression means 303A and 303B are subsequently withdrawn from the container 300, permitting it to return to its normal volume. A portion of air 308 will be drawn into the container cavity 301, resulting in the first void space 309. The volume of the first void space 309 is substantially equal to the volume of liquid 302 that was expelled from the container 300 during the extending step depicted in FIG. 3B.

Figure 3E:
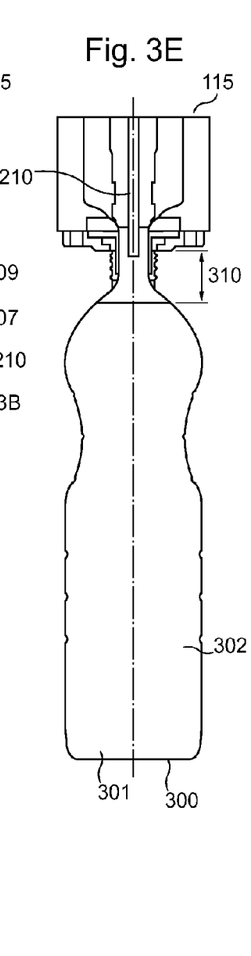

FIG. 3E depicts the injection head 115 and the container 300 at the conclusion of the withdrawing step. The stretching rod 117 is completely retracted from the container cavity 301, resulting in the enlarged second void space 310. The second void space 310 has a volume that is substantially equal to the volume of the first void space 309, plus the volume of the portion of the stretching rod 117 which was advanced into the container cavity 301 during the injecting step described above and depicted in FIG. 2B.

Figure 4A:
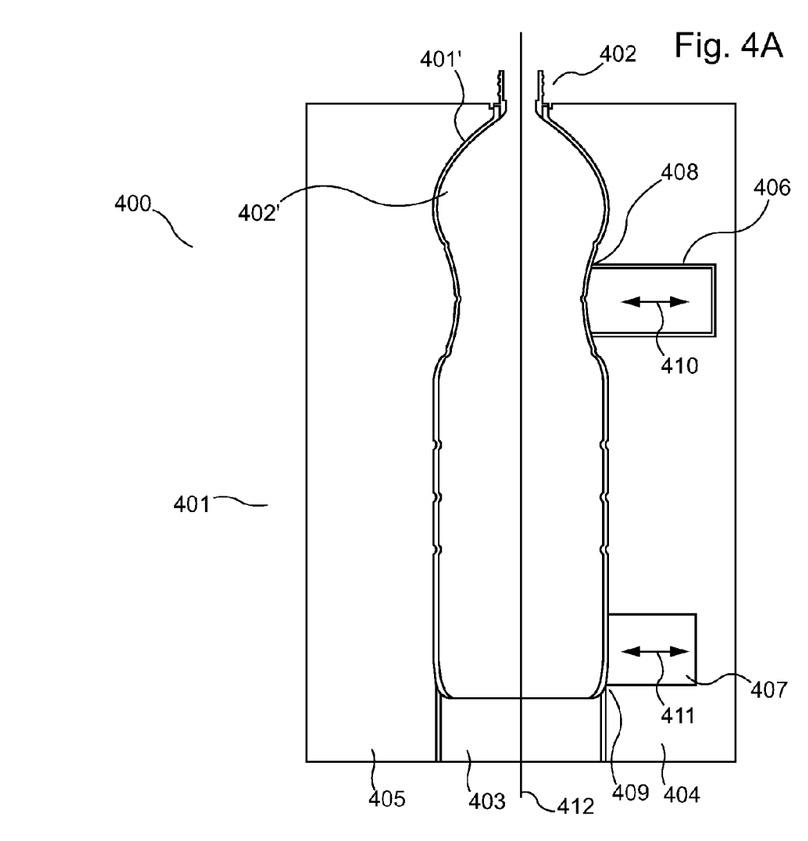
FIGS. 4A and 4B are orthogonal section views of an apparatus according to a second embodiment, viewed from the side and top, respectively, immediately prior to an extending step.
Figure 4B:
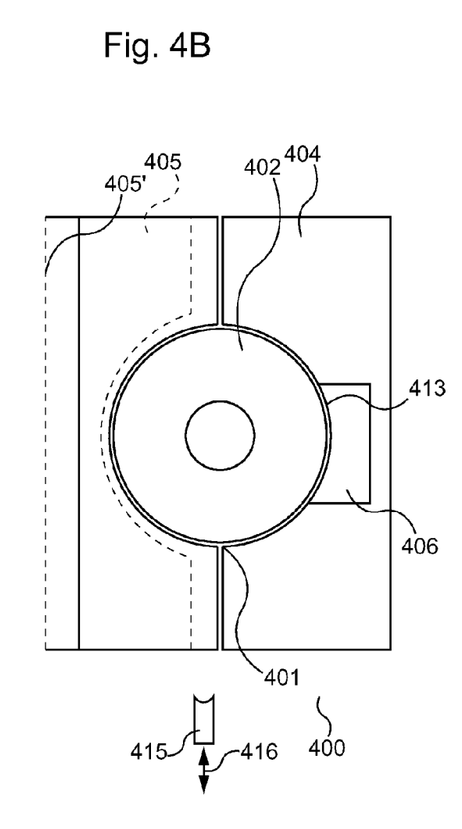

FIGS. 4A and 4B are orthogonal section views of an apparatus 400 according to a second embodiment, viewed from the side and top respectively, immediately prior to an extending step.

FIG. 4A depicts the apparatus 400, wherein there is a mold 401 defining a mold cavity 401' substantially in the form of the container 402, which has been fabricated therein by the injection of the volume of liquid 402'.

The mold 401 is comprised of a base mold segment 403, a first lateral mold segment 404 to the right of the container and a second lateral mold segment 405 to the left. The base mold segment 403 and second lateral mold segment 405 are substantially solid pieces, but the first lateral mold segment 404 is provided with an upper compression tab 406 and a lower compression tab 407.

In this embodiment, the upper compression tab 406 is disposed in proximity to a waist 408 of the container 402, formed where the radius of the mold cavity 401' is locally reduced. The lower compression tab 407 is disposed in proximity to the foot 409, at the base of the container 400. However, it should be understood that the positioning of a compression tab or array of tabs may vary according to the particular application in which they are employed.

Both the upper and lower compression tabs 406 and 407 are mobile relative to the first lateral mold segment 404: the upper compression tab 406 along the upper axis 410 and the lower compression tab along the lower axis 411. Furthermore, both the upper and lower axes 410 and 411 are perpendicular to the common longitudinal axis 412 of the mold cavity 401' and container 402.

Preferably, the displacements of the upper and lower compression tabs 406 and 407 are mutually independent. Since it is positioned at the waist of the container 402, the upper compression tab 406 will deform the container 402 to a greater degree, and thus expel a greater volume of liquid 402' for a given degree of extension into the mold cavity 401', than the lower compression tab 407. One may thus fine-tune the expulsion of liquid 402' from the container, by adjusting the extension of the upper and lower compression tabs 406 and 407 both in an absolute sense and relative to each other.

FIG. 4B is a view of the apparatus 400 in section, from the top and with the upper compression tab 406 visible, immediately prior to an extending step. The upper compression tab 406 has a curved contact surface 413, which is configured to form a portion of the surface of the mold cavity 401' in which the container 402 is disposed. By this fact, then, the upper compression tab 406 will conform exactly to the portion of the surface of the container 402 upon which it acts.

It should be noted that in this embodiment, there is provided one of each of the upper and lower compression tabs 406 and 407. In other embodiments, it may be preferable to provide a plurality of compression means acting at a particular radius of the container, preferably in a substantially uniform angular disposition about a longitudinal axis of the container. For example, one may provide two upper compression tabs disposed 180° apart and three lower compression tabs disposed 120° apart, or four compression means in a different configuration and acting at still another location upon the surface of the container disposed 90° apart, and so on. The exact number, location, and configuration of the compression means will depend on the particular characteristics of the container being fabricated, and may be chosen by one skilled in the art according to these and other factors.

FIG. 4B further depicts the disposition of the first and second lateral mold segments 404 and 405 immediately prior to the extending step. In this embodiment, the second lateral mold segment 405 is retained substantially in the same closed position used during the fabrication of the container.

However, in some embodiments it may instead be advantageous to dispose the second lateral mold segment in an open position, shown here by the second lateral mold segment 405' depicted here. This opening of the apparatus prior to the extension step will provide space to partially accommodate the deformation of the container 402.

The open position assumed by the second lateral mold segment 405' further provides a compression gap 414 between the first and second lateral mold segments 404 and 405', permitting an exterior compression tab 415 to be advanced along the exterior compression axis 416 and into the mold cavity 401'. Employing an external compression tab 415 is particularly advantageous in that, since it forms no portion of the surface of the mold cavity 401', it will not leave any mold lines or other markings on the container. This is particularly useful where a high-quality surface finish is desired in the container 402.

The exact configuration and operation of the invention as practiced may thus vary from the foregoing description without departing from the inventive principle described therein. Accordingly, the scope of this disclosure is intended to be exemplary rather than limiting, and the scope of this invention is defined by any claims that stem at least in part from it.

In particular, it should be understood that great possibility for variation and adaptation of the number, form, and disposition of the compression means is 5 possible. It should be further understood that the closure means may be integrated into the segments of the mold themselves, or alternately provided separately. Furthermore, while the embodiments discussed in this document employ compression means disposed so as to act in a direction perpendicular to a longitudinal axis of a mold cavity, it is of course possible to configure the compression means to act in any direction relative to the mold cavity and the container therein. In particular, it may be advantageous in certain situations to provide the compression means in a base mold segment, acting in a direction perpendicular to the longitudinal axis of the mold cavity and compressing the container therein from its bottom. The exact configuration of the compression means may be adapted to the particular application in which the apparatus comprising them is to be employed.

Of course, the invention is not limited to the embodiments described above and in the accompanying drawings. Modifications remain possible, particularly as to the construction of the various elements or by substitution of technical equivalents, without thereby departing from the scope of protection of the invention.

The invention claimed is:

1. An apparatus for the fabrication of a container, said apparatus comprising:
a mold, said mold comprising a plurality of mold segments substantially defining a mold cavity in the form of a container, and being further configured to accommodate a substantially tubular preform having a closed first end and defining a preform cavity communicating with a mouth at an open second end;
an injection head, said injection head configured to interface with the mouth of the preform and establish fluid communication between a liquid supply and said mouth; and
an injection valve, said injection valve configured to selectively permit fluid communication through said injection head;
wherein the apparatus further comprises at least one compression member moveable relative to said mold cavity between a retracted and an extended position such that said at least one compression member defines part of said mold cavity in the retracted position and extends into said mold cavity exteriorly of said container in the extended position, the extended position being configured to expel liquid from the container through the injection head.

2. The apparatus of claim 1, wherein the at least one compression member is mobile in a direction perpendicular to a longitudinal axis of the mold cavity.

3. An apparatus for the fabrication of a container, said apparatus comprising:
a mold, said mold comprising a plurality of mold segments substantially defining a mold cavity in the form of a container, and being further configured to accommodate a substantially tubular preform having a closed first end and defining a preform cavity communicating with a mouth at an open second end;
an injection head, said injection head configured to interface with the mouth of the preform and establish fluid communication between a liquid supply and said mouth;
an injection valve, said injection valve configured to selectively permit fluid communication through said injection head; and
the apparatus further comprises at least two compression members radially moveable relative to a longitudinal axis of said mold cavity between a retracted and an extended position such that said at least two compression members define part of said mold cavity in the retracted position and extends into said mold cavity exteriorly of said container in the extended position to expel liquid from the container through the injection head, wherein the at least two compression members extend into the mold cavity at an area of locally reduced diameter of said mold cavity.

4. An apparatus for the fabrication of a container, said apparatus comprising:
a mold, said mold comprising a plurality of mold segments substantially defining a mold cavity in the form of a container, and being further configured to accommodate a substantially tubular preform having a closed first end and defining a preform cavity communicating with a mouth at an open second end;
an injection head, said injection head configured to interface with the mouth of the preform and establish fluid communication between a liquid supply and said mouth;
an injection valve, said injection valve configured to selectively permit fluid communication through said injection head; and
the apparatus further comprising at least two compression members radially moveable relative to a longitudinal axis of said mold cavity between a retracted and an extended position such that said at least two compression members define part of said mold cavity in the retracted position and extends into said mold cavity exteriorly of said container in the extended position to expel liquid from the container through the injection head, wherein the at least two compression members being disposed so as to radially extend into the mold cavity at substantially uniform angular intervals about a longitudinal axis of said mold cavity when in the extended position.

5. The apparatus of claim 1, wherein at least two compression tabs are disposed within one of the mold segments.

6. The apparatus of claim 1, wherein the injection valve is disposed within the injection head coaxially with a nozzle of said injection head, said injection valve seating in said nozzle when in a closed position.

7. The apparatus of claim 1, further comprising a stretching rod mobile relative to the preform along a longitudinal axis of said preform and configured to press against an interior surface of said preform at the closed first end thereof.

8. A method for the fabrication of a container, comprising the steps of:
 providing a substantially tubular preform, said preform having a closed first end and defining a preform cavity communicating with a mouth at an open second end;
 disposing the preform at least partially within a mold comprised of a plurality of mold segments and being provided with a mold cavity substantially defining the form of a container;
 positioning an injection head upon the mouth of the preform, said injection head establishing fluid communication between said mouth and a liquid source, an injection valve selectively permitting fluid communication through said injection head;
 opening the injection valve and injecting a volume of liquid into the preform cavity, said liquid flowing from the liquid source to said preform cavity through the injection head and the open injection valve, the preform being thereby induced to expand into the contours of the mold cavity and form a container;
 extending at least one compression member from a retracted position outside said mold cavity into an extended position projecting into said mold cavity and contacting an exterior of said container, said container being thereby compressed and a portion of the liquid within said container being thereby expelled from the container through the injection head;
 closing the injection valve, thereby blocking fluid communication between the container and the liquid source, and
 withdrawing the injection head and the at least one compression member from the container.

9. The method of claim 8, wherein said at least one compression member is a compression tab comprising a portion of and being mobile relative to at least one of said mold segments and forming a portion of the surface of said mold cavity when in the retracted position.

10. The method of claim 8, further comprising that between the injecting and extending steps there is a step for separating the mold segments.

11. The method of claim 8, further comprising that during the injecting step a stretching rod is inserted into the preform cavity through the mouth of the preform, said stretching rod being pressed into an interior surface of the closed first end of said preform in inducing said preform to deform along its longitudinal axis.

* * * * *